(12) United States Patent
Legois et al.

(10) Patent No.: US 7,929,194 B2
(45) Date of Patent: Apr. 19, 2011

(54) FUNCTIONALIZED GLAZING

(75) Inventors: Vincent Legois, Germigny des Pres (FR); Pierre Chaussade, Orleans (FR); Jean-Christophe Giron, Eupen (BE); Pierre-Alain Gillet, Mareil-Marly (FR)

(73) Assignee: Saint-Gobain Glass France, Courbevoie (FR)

( * ) Notice: Subject to any disclaimer, the term of this patent is extended or adjusted under 35 U.S.C. 154(b) by 0 days.

(21) Appl. No.: 12/519,182

(22) PCT Filed: Dec. 6, 2007

(86) PCT No.: PCT/FR2007/052451
§ 371 (c)(1),
(2), (4) Date: Aug. 11, 2009

(87) PCT Pub. No.: WO2008/078026
PCT Pub. Date: Jul. 3, 2008

(65) Prior Publication Data
US 2010/0020381 A1    Jan. 28, 2010

(30) Foreign Application Priority Data

Dec. 15, 2006   (FR) ..................... 06 55549

(51) Int. Cl.
*G02F 1/153* (2006.01)
*G02F 1/03* (2006.01)

(52) U.S. Cl. ..................... 359/275; 359/242

(58) Field of Classification Search .......... 359/265–275, 359/277, 245–247, 254, 242; 345/49, 105; 250/70; 438/929
See application file for complete search history.

(56) References Cited

U.S. PATENT DOCUMENTS

| | | | |
|---|---|---|---|
| 3,953,630 A | 4/1976 | Roberts et al. | |
| 7,002,720 B2 * | 2/2006 | Beteille et al. | 359/265 |
| 2005/0002081 A1 | 1/2005 | Beteille et al. | |
| 2007/0020442 A1 | 1/2007 | Giron et al. | |

FOREIGN PATENT DOCUMENTS

| | | |
|---|---|---|
| DE | 101 18 617 | 11/2002 |
| FR | 2 175 910 | 10/1973 |
| FR | 2 829 723 | 3/2003 |
| FR | 2 857 617 | 1/2005 |

* cited by examiner

*Primary Examiner* — Ricky L Mack
*Assistant Examiner* — Dawayne A Pinkney
(74) *Attorney, Agent, or Firm* — Oblon, Spivak, McClelland, Maier & Neustadt, L.L.P.

(57) ABSTRACT

Glazing comprising, in succession:
  a first rigid substrate (S1);
  a second rigid substrate (S2);
  a third rigid substrate (S3);
  at least one "active" system (A) that includes at least one layer and is placed between the substrates (S1 and S2), the first substrate (S1) optionally being set back in relation to the other two substrates (S2, S3); and
  at least one polymer film having the function of retaining glazing fragments should the glazing break, said film being placed between the substrate (S1) and the substrate (S2) and between the substrate (S2) and the substrate (S3).

13 Claims, 1 Drawing Sheet

FUNCTIONALIZED GLAZING

Figure 1:
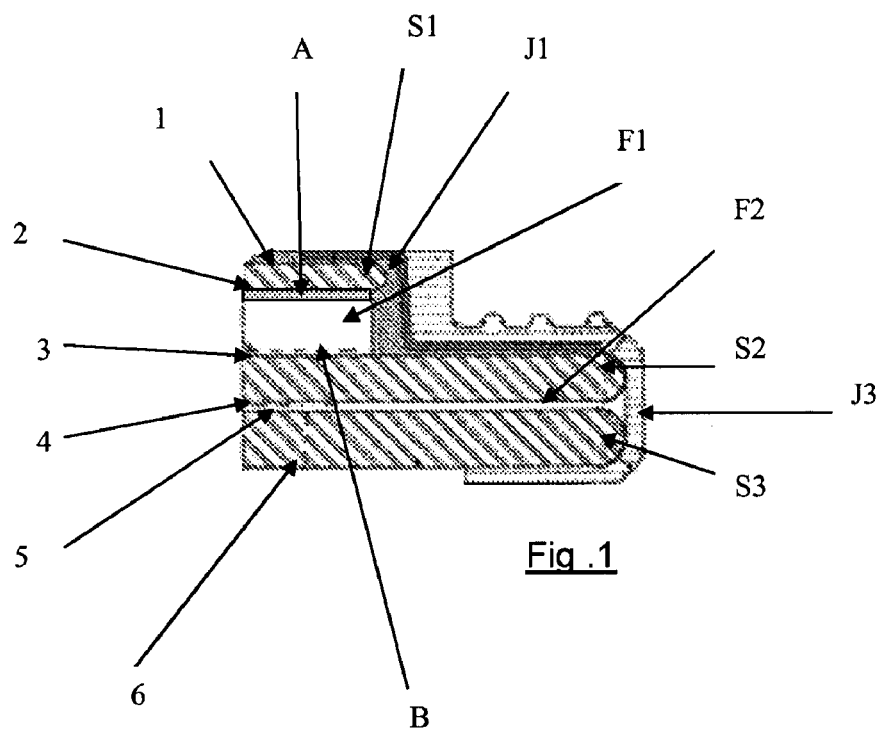

The present application is the US counterpart of WO 2008/078026, the text of which is incorporated by reference, and claims the priority of French application No. 0655549, filed on Dec. 15, 2006, the text of which is incorporated by reference.

The present invention relates to aviation glazing characterized in two ways:

firstly, glazing referred to as "safety" glazing in the sense that this is capable of retaining fragments (especially glass fragments) in the event of breakage. Such glazing meets in particular the regulatory provisions of JAR/FAR 25.1309 and AMJ 25.1309. This glazing preferably successfully passes the tests described in these regulatory provisions under the "chicken-firing test" terms. The most usual configuration of this type of glazing is that of standard laminated glazing consisting of at least three essentially transparent rigid substrates (generally made of glass) placed between which is at least one sheet of thermoplastic polymer which will ensure the retention of fragments should the glass break. The lamination generally requires, as is known, the three assembled elements to be heated, generally under pressure, so as to soften the thermoplastic sheet and make it adherent and possibly to eliminate the residual air between the various elements of the glazing; and secondly, glazing according to the invention is "functionalized", which means that it has at least one functionality conferred by one or more thin layers and/or one or more discontinuous elements which may be of organic, mineral or organo-mineral hybrid type (these layers or elements generally being placed against one of the rigid substrates of the glazing according to the invention). These will be denoted hereafter by the term "active system(s)"—the glazing according to the invention may include one or more of them.

The first types of active system pertinent to the invention are electrochemical systems in general, and more particularly electrically controllable systems of the window type having variable energy and/or optical properties.

Electrically controllable systems are used in particular to obtain windows for which it is possible to modify, at will, the darkening/degree of vision or degree of thermal/solar radiation filtration. These are for example viologen-based windows, which allow light transmission or absorption to be adjusted, such as those described in U.S. Pat. No. 5,239,406.

There are also electrochromic windows, which allow the light and thermal transmission to be modulated. They are described for example in patents EP-253 713 and EP-670 346, the electrolyte being in the form of a polymer or of a gel, and the other layers being of mineral type. Another type is described in patents EP-867 752, EP-831 360, WO 00/57243 and WO 00/03289, the electrolyte this time being in the form of an essentially mineral layer, all of the layers of the system then being essentially mineral: this type of electrochromic system is commonly referred to by the term "all-solid" electrochromic system. Within the meaning of the invention, "all solid" is used when all the layers forming the active multilayer are of inorganic nature, for example based on metal oxides.

There are also electrochromic systems in which all of the layers are of polymer type, which are then referred to as "all-polymer" electrochromic systems.

In general, electrochromic systems comprise two layers of electrochromic material that are separated by an electrolyte layer and flanked by two electroconductive layers.

There are also systems called "optical valves". These are polymer-based films in which microdroplets containing particles capable of adopting a preferential direction under the action of an electric field are placed. An example of this is described in patent WO 93/09460.

There are also liquid-crystal systems, the operating mode of which is similar to the previous systems. They use a polymer film placed between two conducting layers, droplets of liquid crystals, especially nematic liquid crystals of positive dielectric anisotropy, being dispersed in said film. When voltage is applied to the film, the liquid crystals are oriented along a preferential axis, thereby permitting vision. With no voltage applied, the film becomes scattering. Examples thereof are described in patents EP-88 126, EP-268 877, EP-238 164, EP-357 234, EP-409 442 and EP-964 288. Mention may also be made of cholesteric liquid-crystal polymers, such as those described in patent WO 92/19695, and liquid-crystal systems that switch with variation in light transmission $T_L$.

Within the context of the present invention and throughout the present text, the term "layer" should be taken in its widest sense. The materials that may be involved are both mineral materials and organic materials.

These multilayers may be deposited on one of the rigid substrates or deposited on a flexible substrate of the PET (polyethylene terephthalate) type which is placed between two sheets of a thermoplastic polymer of the PVB (polyvinyl butyral) type to be assembled with the two rigid substrates of glass type. Examples of these are found in patents EP-638 528, EP-718 250, EP-724 955, EP-758 583 and EP-847 965.

To design glazing that has the two characteristics described above is not simple, since combining an active system with polymer sheets having the function of retaining fragments and splinters in glazing creates additional constraints. Thus, if an active system, for example an electrochromic system, is inserted into conventional laminated glazing between the glass and the polymer interlayer film, this tends to reduce the adhesion of the polymer film to the glass. There is therefore a greater risk, in the event of the window breaking, of the glass fragments and splinters no longer being able to be predominantly retained by the polymer film, as the regulatory provisions dictate.

If, to obviate this, the active system is placed on one of the external faces of standard laminated glazing, it would then be necessary to provide means for protecting it from coming into contact with the ambient atmosphere, so as to protect it from undergoing chemical or mechanical degradation. This therefore dictates the use of an additional protective substrate.

However, a number of applications require a nominal glazing thickness, and it is not always possible to propose (excessively) thick windows.

This is particularly the case with aviation glazing as front windows or side windows, for which the reserved thickness in the cockpit rebate allowing flush-fitting of the glazing is a fundamental parameter, since it is a structural parameter (the thickness also determines the resistance to compressive forces resulting from the pressurization of the aircraft in flight).

In general, a cockpit window consists of three glass panes, namely two structural panes made of glass having a very high modulus of rupture and one heating, external pane made of glass having a high modulus or else a semi-toughened soda-lime glass. The two structural panes are designed to withstand the impact of a bird and the aircraft pressurization. In particular if one of the panes breaks, the second is capable of maintaining the aircraft pressure. The heating pane allows the transparency of the windshield to be maintained by deicing the external face irrespective of the flight conditions.

It is therefore an object of the invention to propose a novel type of glazing which can reconcile compliance with the manufacturers' stipulations with the presence within the glazing of at least one of the active systems described above. More particularly, the object of the invention is to design such glazing which may also not be significantly penalized in terms of dimensions in relation to a cockpit window (both side and front window). The latter point is clearly an advantage when the glazing is intended for the replacement market.

The subject of the invention is primarily glazing comprising, in succession:
- a first rigid substrate S1;
- a second rigid substrate S2;
- a third rigid substrate S3;
- at least one "active" system A that includes at least one layer and is placed between the substrates S1 and S2, the first substrate S1 optionally being set back in relation to the other two substrates S2, S3; and
- at least one polymer film having the function of an adhesive interlayer and the function of retaining glazing fragments should the glazing break, said film being placed between the substrate S1 and the substrate S2 and between the substrate S2 and the substrate S3.

The invention has therefore perfected a type of glazing that allows safety, functionality and dimensions to be reconciled.

In the case of glazing intended for aeronautical use (to be fitted as side window and/or front window in the cockpit), the glazing includes at least two polymer films with a fragment-retaining function essential for obtaining the desired level of safety in the case of a window breaking. Each of the films is interposed respectively the substrates S1 and S2 and S2 and S3.

Within the context of the invention, the glazing with its three substrates S1, S2, S3 is defined in the following manner: the substrate S1 has an external face turned toward the outside of the cockpit; the substrate S3 has an internal face turned toward the inside of the cockpit; and the substrate S2 lies between the substrates S1 and S3.

Advantageously, the active system is positioned on one of the faces of the polymer film joining the substrate S1 to the substrate S2. As a variant, the active system may be positioned only on a surface portion of the substrate S1 or S2, and in this case it may for example be a strip providing a sunshield functionality.

The positioning of the active system on one or other of the faces of the polymer film may then be selected according to that of other active systems commonly encountered in aeronautical glazing (such as anti-fogging heating layers, deicing layers).

The presence of a second polymer film having the function of retaining the splinters or fragments, and in contact with the active system, may contribute to the safety of the window, but this role is mainly dedicated to that which is not in contact with it. Thus, by physically separating the fragment-retaining film from the active system, these two can coexist in the glazing without one undermining the functionality of the other. However, the downside of this solution is that the glazing contains three substrates rather than two. Most particularly in the case in which there are three rigid glass substrates, it is clear that this results in glazing that is generally thicker than standard laminated glazing consisting of two glass panes. This is the reason why the invention proposes that substrate S1 be set back in relation to the other two: being of smaller dimensions, it thus leaves a peripheral zone of the perimeter of the substrate S2 associated with S3 allowing it to be flush-fitted into the rebate of the cockpit.

The active system according to the invention may be of the electrically controllable type, having variable optical and/or energy properties of the electrochromic system, optical valve, viologen system, liquid-crystal system or electroluminescent system type. Details about these systems were given in the preamble of the present application.

According to the invention, the substrates S1, S2 and S3 are made of thermally semi-toughened or chemically toughened glass—they are of the soda-lime type or else of the "Solidion" (registered trade mark of the Applicant) brand—and are laminated together by means of lamination interlayers.

According to a variant of the invention, the glazing according to the invention includes at least one sheet of thermoplastic polymer having an adhesive interlayer function and a glass-fragment-retaining function (if the glazing is made of glass) in the event of the glazing breaking, which sheet is placed between the substrates S1 and S2 and between the substrates S2 and S3. If there are several thermoplastic polymer sheets (or a superposition of such sheets), it is therefore that one which is not in contact with the electrochromic-type active system which will play the essential safety role.

If we number the faces of the panes as 1 to 6 going from the outside to the inside (considering the window once mounted in the cockpit of the aircraft), it is therefore possible to have, for example, an active system A of the electrochromic type on face 2 (the inside face of S1) or on face 3 (the outside face of S2) depending on the case, and it is the thermoplastic interlayer sheet with which it is not in contact that gives the window the safety aspect.

Preferably, the substrates S2 and S3 have substantially identical dimensions, S1 having smaller dimensions—it is positioned relative to the substrate S2 so as to define an open peripheral groove of sufficient dimensions to allow the glazing to be fitted into the rebate of the cockpit.

As regards the dimensions of the active system A, its active surface preferably has dimensions similar to or smaller than those of the first substrate S1. The term "active surface" is understood to mean the surface that has effectively the desired functionality, excluding in particular the inactive peripheral zones used for connections. If the active system is on one of the faces of the substrate S1, this sizing is obligatory. If instead it is on one face of the substrate S2, this sizing allows the active system to be better adapted to the central zone of the glazing, which will actually be exposed to view, and not to the peripheral zone of the substrates S2 and S3 which "overhangs" the substrate S1 and which, for esthetic reasons, will therefore generally be masked.

The abovementioned semi-open peripheral groove created in the glazing, owing to the fact that the substrate S1 is set back, may be used in various ways and exploited to great advantage. Of course, it allows the glazing assembly to be fastened in its housing reserved for it within the rebate of the cockpit. However, this freed space also makes it possible, for example, to run along it connection elements for the active system when the latter is electrically controllable.

The particular configuration of the glazing and its integration as side window and/or front window in an airplane cockpit require the use of a number of seals for solving various problems. Thus, peripheral seals will be placed around the zone between S1 and S2 (in which zone the active system—which is highly sensitive to moisture—is incorporated) so as to constitute a barrier to the ambient atmosphere. These seals may be separate seals, one constituting a barrier to liquid water and the other a barrier to water vapor. On account of the large temperature and pressure ranges associated with the use of the airplane, on either side of the glazing (in flight, the interior of the airplane is pressurized and at ambient temperature, whereas on the outside there is a negative temperature (−20° C., −30° C.) and a very low pressure), it is necessary to emprison the glazing assembly provided with these first seals in a second seal suitable for withstanding these stresses, both mechanical and thermal, associated with such extreme use.

Various techniques may be used to make this or these peripheral seals. It is possible to attach them, using prefabricated seals in the form of beads (which are laid down by softening them, for example by gently heating them, so that they can provide the required sealing on the edges of the substrates in question). They may also be extruded, the technique of extruding the seals being used already, in particular for making windshield seals as is described in the patents EP 479 677 and EP 524 060.

The peripheral seal used (or at least one of them) is made so as to be flush with external face 1 of the first substrate S1. Such flush-fitting is particularly attractive as it offers continuity of surface with the cockpit.

Advantageously, the peripheral seal (or seals) may at least partly fill the semi-open peripheral groove described above. Connection elements for the active system A, if this is electrically controllable, and other active systems B (heating layers having an antifogging and/or anti-icing function) may also pass through said seal(s), which may also contain mechanical reinforcing elements (studs, balls, frame, etc.).

The subject of the invention is, more particularly, the embodiment in which the glazing is a triple glazing unit, with three glass panes S1, S2, S3 and double lamination, provided with an all-solid electrochromic system preferably placed on face 2 (the internal face of substrate S1) or on face 3 (the external face of S2). It is therefore the thermoplastic sheet between the substrates S2 and S3 which mainly provides the safety function (retention of fragments in the event of breakage).

The invention covers all applications of the glazing described above, especially for the side and/or front windows with which civil and/or military airplane cockpits are provided or for helicopter windows.

Figure 2:
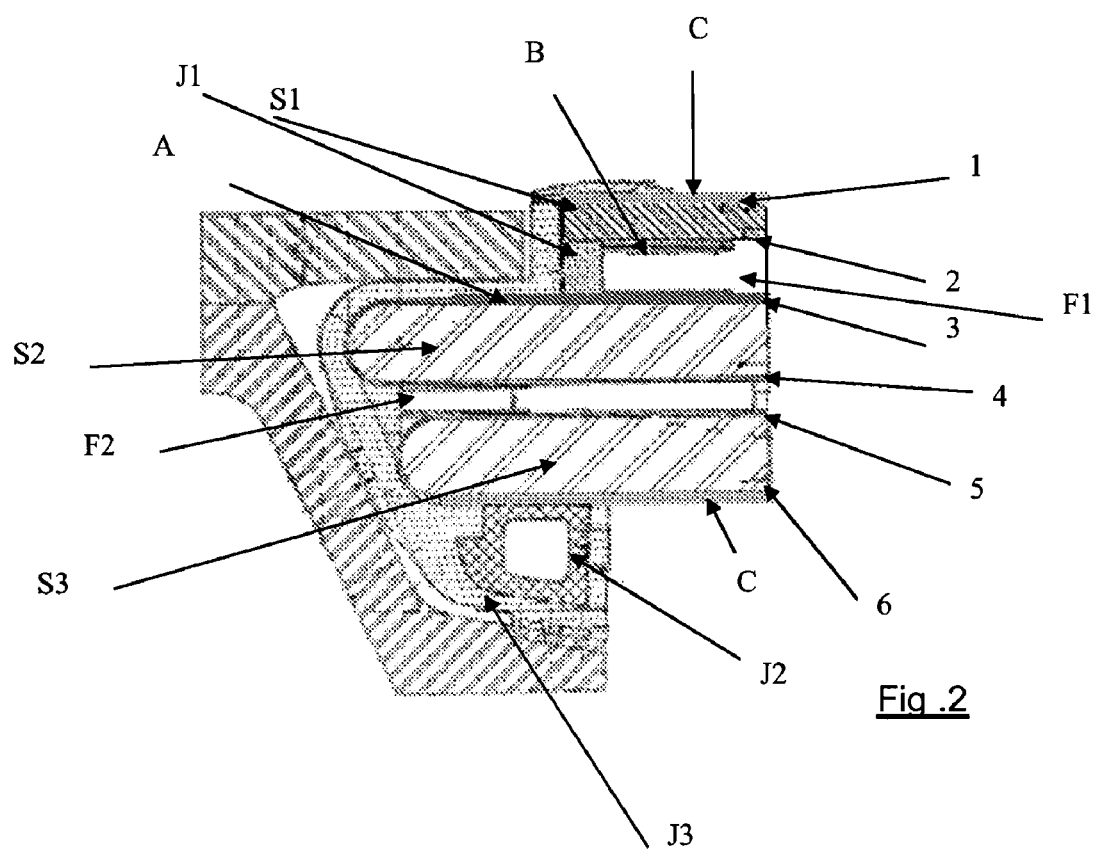

The invention will now be described in detail with the aid of nonlimiting examples illustrated by the following figures:

FIG. 1 is part of a side window according to the invention seen in cross section; and FIG. 2 is part of a front window according to the invention seen in cross section.

The figures are deliberately highly schematic and are not necessarily to scale, in order for them to be easier to understand.

Examples 1 and 2, illustrated by FIGS. 1 and 2 respectively, both relate to a window for the cockpit of an airplane and/or helicopter, more generally for civil or military aircraft. The window comprises, in succession from the outside toward the inside of the passenger compartment, three panes S1, S2, S3, which are clear glass panes (they may also be tinted) made of chemically toughened glass—they are of the "Solidion" (registered trade mark of the Applicant) type and laminated with lamination interlayers between them.

The substrate S1 is optionally smaller than the other two substrates S2 and S3 and set back in relation to them, positioned so as to be centered with respect to S2 and S3. This configuration leaves an open peripheral groove, the depth of which varies according to the examples.

The substrates S2 and S3 have the same size and are of polygonal shape.

The side window example shown in FIG. 1 will be described in detail.

An active system A is placed on face 2 of the substrate S1. This is an all-solid electrochromic system consisting of the following multilayer (starting from face 2 of the substrate S1):

a lower conductive layer (within the context of the invention, the term "lower" is used to mean closest to the substrate S1), which is a bilayer consisting of a 20 to 120 nm first layer of $SiO_xN_y$ surmounted by a 200 to 500 nm second layer of ITO (tin-doped indium oxide);

a first layer of anodic electrochromic material made of hydrated iridium oxide 40 to 100 nm in thickness or hydrated nickel oxide 40 nm to 400 nm in thickness, which may or may not be alloyed with other metals;

a 100 nm layer of tungsten oxide;

a 100 nm second layer of hydrated tantalum oxide or hydrated silica oxide or hydrated zirconium oxide;

a 370 nm second layer of cathodic electro-chromic material based on tungsten oxide $WO_3$; and a 100 to 300 nm upper conductive layer of ITO.

All these layers are deposited in a known manner by reactive magnetron sputtering.

The glass pane S1 is laminated to the glass pane S2 via a thermoplastic sheet F1 made of polyurethane (PU) 3 to 12 mm in thickness (it may be replaced with a sheet of ethylene/vinyl acetate (EVA) or polyvinyl butyral (PVB) or else by a combination of PU and PVB). The sheet F1 at least partly covers the active system A. The sheet F1 has two functions: it serves as adhesive interlayer and it retains the substrate (glass) fragments in the event of breakage.

Another active system B, having a heating function, is deposited on face 3 (the external face of S2). This may be at least one layer based on $SnO_2$:F or ITO, as mentioned above. Depending on the characteristics of this active system B, the heating may give the glazing assembly an antifogging functionality or, if the heating is more intense, this will consequently give the glazing an anti-icing functionality (this will be explained in the example relating to FIG. 2).

The substrate S2 is laminated to a substrate S3 via a thermoplastic lamination interlayer F2 similar to F1 (F2 also possesses these two functions).

Provided on the periphery of the interlayer F1 for combining S1 with S2 while imprisoning the electro-chromic active system A on face 2 (of S1) and the heating active system B on face 3 (external face of S2), is at least one seal J1 providing a barrier to external attacking agents (vapor and liquid moisture respectively).

In the example from FIG. 1, another seal J3 encapsulates the glazing assembly, S1, S2 and S3 laminated using F1 and F2.

This seal J3 allows all the substrates forming the glazing to be mechanically fastened together and thus capable, when they are fitted into the rebate of the cockpit, to be able to withstand all the stresses, both mechanical and thermal, resulting from the flight cycles of the airplane.

It may be pointed out that the seal J3 covers the set-back zone forming the shoulder around the substrate S1, the dimensions (thickness, width, depth) of the seal J3 in this zone being chosen so as to allow optimum fitting between the rebate and the dimensions of the glazing.

One particular advantage results from positioning the active system on face 2 of the substrate S1. It is possible to remove the glazing assembly in order to change the substrate S1 for maintenance purposes, without causing irreversible destruction of the other functionalities of the glazing (in particular, the active system B of heating functionality on face 3 (the external face of S2) is not impacted by this removal).

The front window example shown in FIG. 2 will be described in detail.

An active system A is placed on face 3. This is an all-solid electrochromic system made up of the following multilayer (starting from face 3):
- a lower conductive layer (within the context of the invention, the term "lower" is used to mean closest to the substrate S1), which is a bilayer consisting of a 20 to 120 nm first layer of $SiO_xN_y$, surmounted by a 200 to 500 nm second layer of ITO (tin-doped indium oxide);
- a first layer of anodic electrochromic material made of hydrated iridium oxide 40 to 100 nm in thickness or hydrated nickel oxide 40 nm to 400 nm in thickness, which may or may not be alloyed with other metals;
- a 100 nm layer of tungsten oxide;
- a 100 nm second layer of hydrated tantalum oxide or hydrated silica oxide or hydrated zirconium oxide;
- a 370 nm second layer of cathodic electro-chromic material based on tungsten oxide $WO_3$; and
- a 100 to 300 nm upper conductive layer of ITO.

All these layers are deposited in a known manner by reactive magnetron sputtering.

The substrate S2 is laminated to the substrate S1 via a thermoplastic sheet F1 made of polyurethane (PU) 3 to 12 mm in thickness (it may be replaced with a sheet of ethylene/vinyl acetate (EVA) or polyvinyl butyral (PVB) or else by a combination of PU and PVB). The sheet F1 at least partly covers the active system A and has two functions, like those used in the example shown in FIG. 1.

Compared with the configuration relating to the side window, the electrochromic active system A is in fact positioned on the other face of the thermoplastic sheet F1.

Another active system B, having a heating functionality, is deposited on face 2 of the pane S1. This may be at least a layer based on $SnO_2$:F or ITO, as mentioned above.

In the present case, the use of the glazing as a front window means that the active system must possess an anti-icing functionality, which results, on the heating layer, in greater energy dissipation by the Joule effect than that providing an antifogging functionality (on the side window of example 1). This is why the active system B is located on face 2 of the pane S1 (closest to the external face 1 of the window, which is liable to ice up).

The substrate S2 is laminated to a substrate S3 via a thermoplastic lamination interlayer F2 similar to F1.

Provided on the periphery of the interlayer F1 for combining S1 with S2, imprisoning the electrochromic active system A on face 3 and the deicing active system B on face 2, are at least seals J1 and J2 producing a barrier to the external attacking agents (vapor and liquid moisture respectively).

In the example shown in FIG. 2, another seal J3 encapsulates the glazing assembly consisting of S1, S2 and S3 laminated using F1 and F2.

This seal J3 allows all the substrates forming the glazing to be mechanically fastened together and thus capable, when they are fitted into the rebate of the cockpit, to be able to withstand all the stresses, both mechanical and thermal, resulting from the flight cycles of the airplane.

It may be pointed out that the seal J3 covers the set-back zone forming the shoulder around the substrate S1, the dimensions (thickness, width, depth) of the seal J3 in this zone being chosen so as to allow optimum fitting between the rebate and the dimensions of the glazing.

In FIG. 2, the pane S1 may include a thin-film multilayer C having an antireflection function on face 1 and/or the pane S3 may include a similar multilayer on face 6. As a variant, a multilayer having an electrochromic functionality may be substituted, in place of the multilayer having an antireflection functionality positioned on face 6, and in this case it will be covered by a substrate S4 that protects it and allows it to operate.

As regards the connections for making these aviation windows operate, it is necessary for the external electrical connectors to emerge only in a single place, so as to incur as little a cost as possible when fitting these windows into their supports, a single connector thus supplying the window with the energy needed for the active systems A, B, and for the information coming from probes incorporated into the window, to be processed by the avionics of the aircraft.

One advantageous feature of the invention consists in running the current leads around a very large part of the perimeter of the active system—and even around the entire perimeter—thereby very rapidly uniformizing the electric potential of the upper and lower electrodes needed for the switching of the active system A or for the Joule heating of the heating layers B. The expression "a very large part of the perimeter" should be understood here to mean at least more than half, preferably two-thirds, three-quarters, etc., until completely surrounding it. This is at present also possible only with a single collector conductor. Thus, the option of bringing out the external connectors for the functional element at a single place on the window is maintained.

The current leads may consist of conductive bands made of copper or the like, running around a very large part of the perimeter of the window, these being in electrical contact, on the one hand, with the upper and lower electrodes for the active systems (a judiciously chosen current path will prevent any shorting) and, on the other hand, with electrical connectors connected to the preferably single output connector.

The invention claimed is:

1. Glazing suitable for a side or front window for an airplane or helicopter cockpit, comprising, in succession:
    a first rigid substrate (S1) comprising an outside face to be outside of the cockpit;
    a second rigid substrate (S2);
    a third rigid substrate (S3) comprising an inside face to be inside the cockpit,
    wherein the second rigid substrate (S2) positioned between the first rigid substrate (S1) and the third rigid substrate (S3),
    wherein the substrates are made of thermally semi-toughened or chemically toughened glass;
    a first active system (A) that includes at least one layer and is positioned between substrates (S1) and (S2),
    a second active system (B) that is a thin-film multilayer system comprising a heating function and positioned between the substrates (S1) and (S2),
    wherein the first substrate (S1) is set back in relation to the other two substrates (S2) and (S3) with a set back zone around the periphery of the first substrate (S1); and
    at least one polymer film (F1, F2) functioning as an adhesive interlayer and retaining glazing fragments should the glazing break, said film positioned between substrate (S1) and substrate (S2) and between substrate (S2) and substrate (S3), and
    a seal (J3) that encapsulates the substrates (S1), (S2) and (S3) and that covers the set back zone and periphery of the first rigid substrate (S1).

2. The glazing as claimed in claim 1, wherein the active system (A) is an electrically controllable system, having variable optical and/or energy properties of the electrochromic system, optical valve, viologen system, liquid-crystal system or electroluminescent system type.

3. The glazing as claimed in claim 1, wherein the active system (A) is positioned on face 2 of substrate (S1).

4. The glazing as claimed in claim 1, wherein the active system (A) is positioned on face 3 of substrate (S2).

5. The glazing as claimed in claim 1, wherein the active system (A) is positioned in a surface portion of substrate (S1) or (S2).

6. The glazing as claimed in claim 1, wherein an active system (B) is positioned on face 3 of substrate (S2).

7. The glazing as claimed in claim 1, wherein an active system (B) is positioned on face 2 of substrate (S1).

8. The glazing as claimed in claim 6, wherein the active system (B) is a thin-film multilayer system having a heating functionality.

9. The glazing as claimed in claim 1, wherein faces 1 and 6 on the substrate (S1) and the substrate (S3) respectively are covered with a multilayer (C) having an antireflection functionality.

10. The glazing as claimed in claim 1, wherein current leads run around a part of the perimeter of active system (A) and (B).

11. The glazing as claimed in claim 1, which is triple glazing provided with an all-solid electrochromic system (A) placed on either of faces 2 and 3 of (S1) or (S2), respectively.

12. The glazing as claimed in claim 1, which passes the safety test of the FAR 25/JAR 25 standards.

13. An airplane or helicopter, comprising the glazing as claimed in claim 1, as cockpit side or front window.

* * * * *